Figure 3:
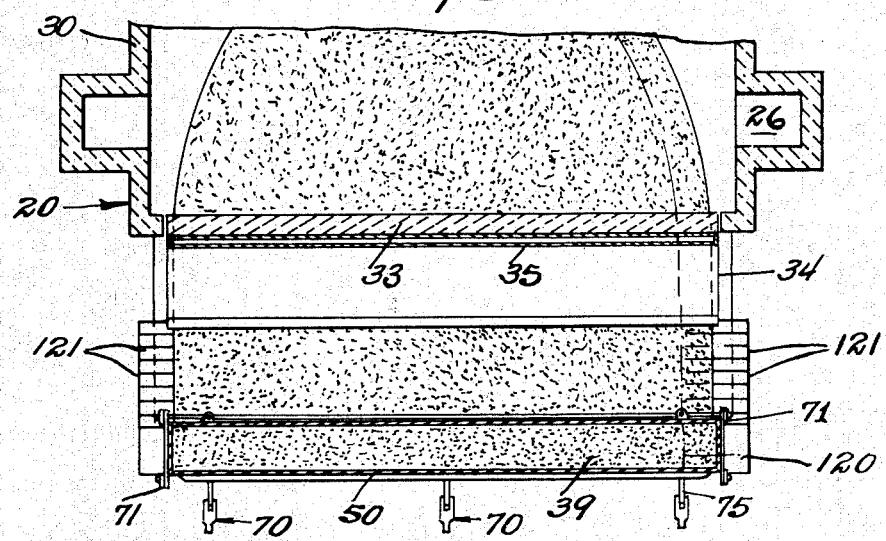

April 28, 1942.                J. H. REDSHAW                2,281,050
                          BATCH FEEDING APPARATUS
                          Filed April 11, 1940         3 Sheets-Sheet 1
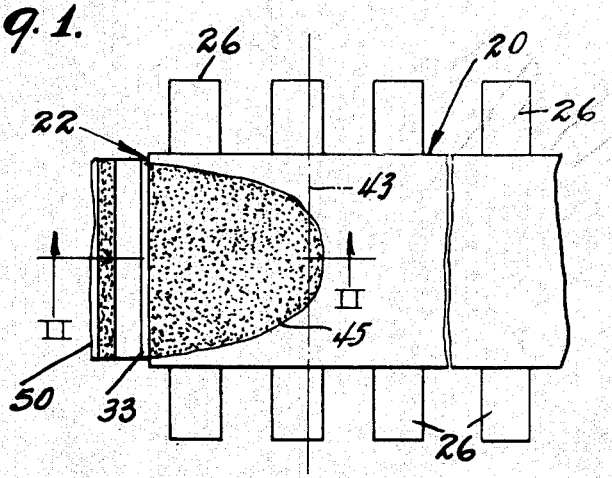
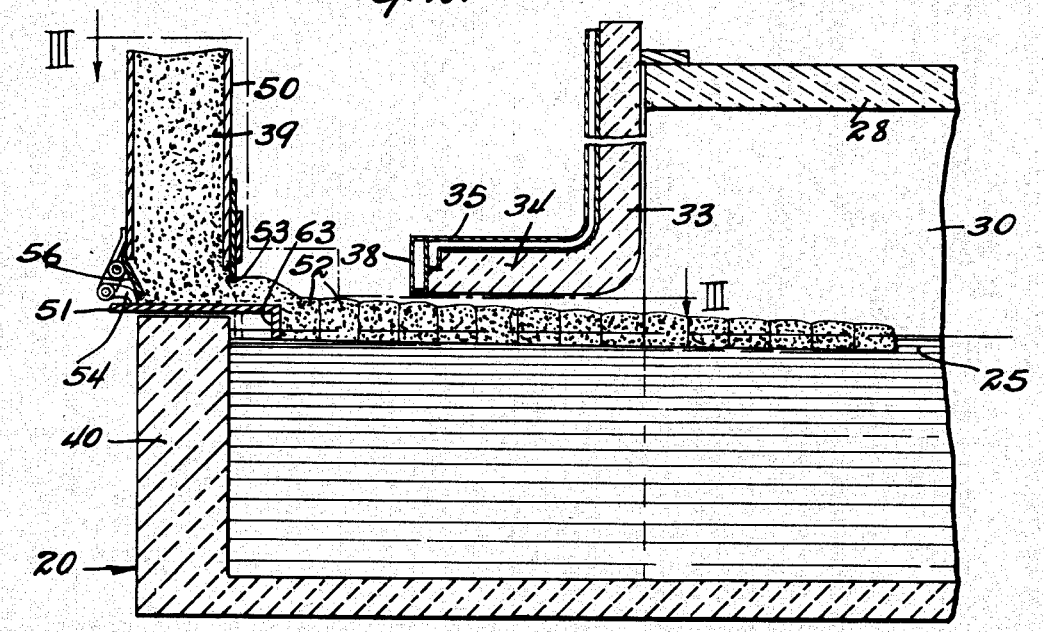
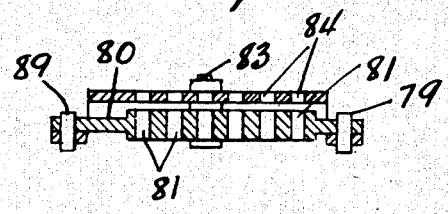
Inventor
JOSEPH H. REDSHAW
By Olew E. Bee
Attorney April 28, 1942.  J. H. REDSHAW  2,281,050

BATCH FEEDING APPARATUS

Filed April 11, 1940  3 Sheets-Sheet 2

Inventor
JOSEPH H. REDSHAW
By Olen E. Bee
Attorney

April 28, 1942.  J. H. REDSHAW  2,281,050
BATCH FEEDING APPARATUS
Filed April 11, 1940  3 Sheets-Sheet 3
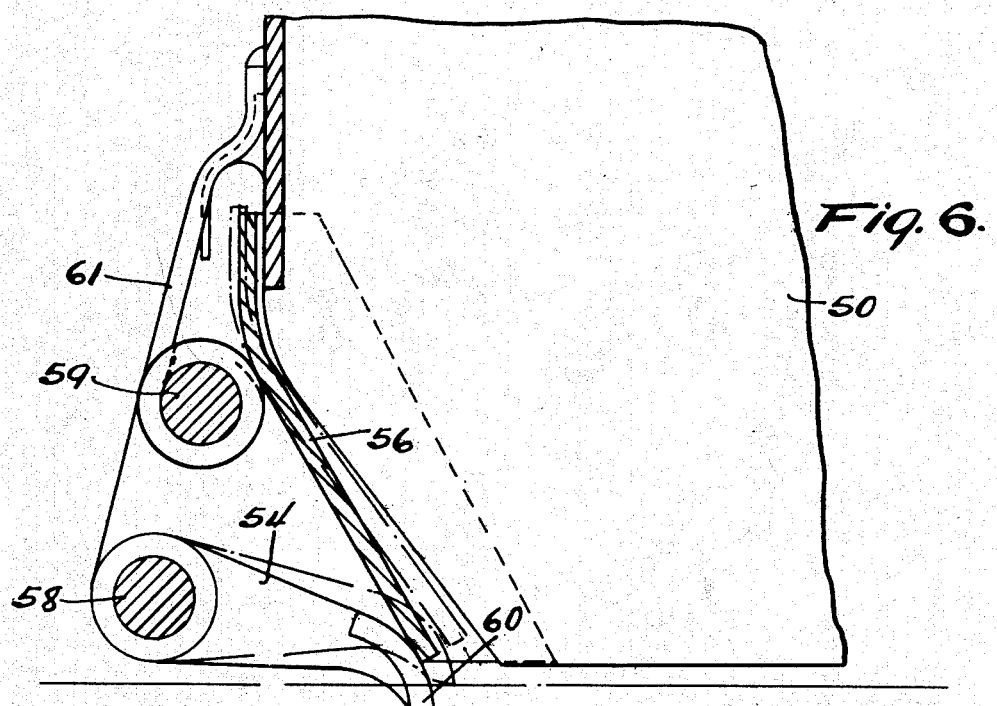
Fig. 6.
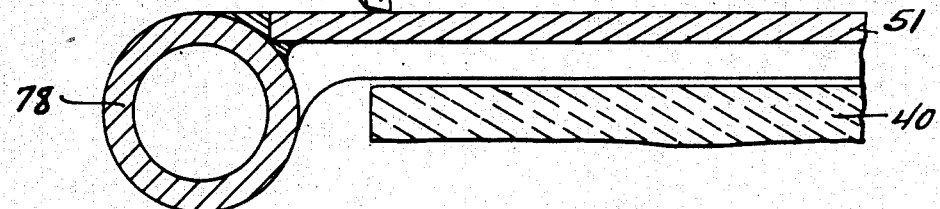
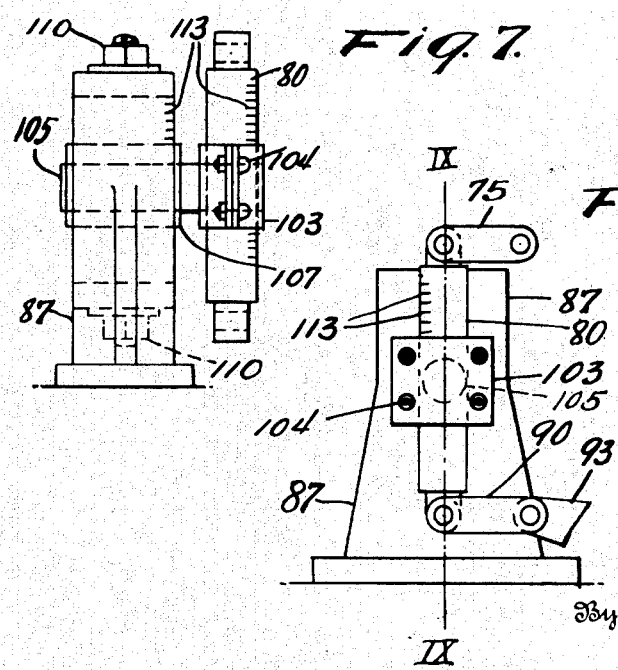
Fig. 7.
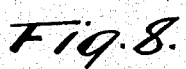
Fig. 9.
Fig. 8.
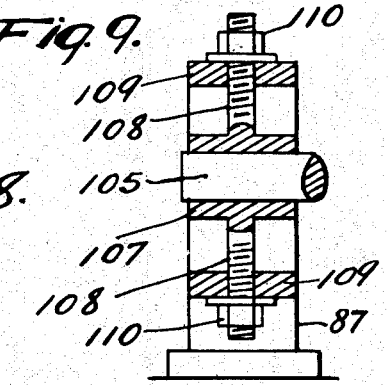
Inventor
JOSEPH H. REDSHAW
By Olew E. Bee
Attorney Patented Apr. 28, 1942

2,281,050

UNITED STATES PATENT OFFICE 2,281,050

BATCH FEEDING APPARATUS

Joseph H. Redshaw, Homestead, Pa., assignor to Pittsburgh Plate Glass Company, Allegheny County, Pa., a corporation of Pennsylvania Application April 11, 1940, Serial No. 329,089

8 Claims. (Cl. 49—54)

This invention relates to apparatus for feeding granular material and it has particular relation to apparatus for incorporating glass-making material in a molten glass bath of a glass melting tank.

One object of the invention is to provide an improved apparatus for charging granular batch uniformly into a tank of molten material.

Another object of the invention is to provide an improved apparatus for charging glass-making batch into a glass melting tank in such manner as to insure in the tank the formation of a uniform blanket of batch material subject to uniform melting therein.

Another object of the invention is to provide an improved apparatus for progressively feeding layers of glass-making batch material into a tank to form a substantially uniform blanket of the material as it proceeds into the interior of the tank.

In the conventional and customary practice of feeding batch material into a glass melting tank or furnace, certain disadvantages were present by virtue of the difficulty experienced in securing uniform melting of the material and also in securing maximum efficiency of the heating mediums employed to reduce the material to molten state. It has been customary to employ flames from fuel, such as gas, projected laterally from opposite sides of the furnace through ports formed therein.

Various types of feeding devices for granular material have been proposed, such as the type in which there was provided a relatively narrow enclosure, or so-called "dog house" at the entrance or charging end of the tank for receiving bulky piles of batch which were then pushed through a suitable opening or gate into the body of the tank. Unwieldly mounds of batch were in this manner distributed or localized adjacent the entrance end of the tank and they floated and melted unevenly toward the discharge end of the tank. Other types dumped quantities of batch material adjacent the entrance end of the tank, and the material, as it was melted, flowed toward the exit, or glass drawing end of the tank. Such feeding involved periodical exposure of the bath by opening doors through which the material was supplied and also involved agitating the body of the bath, as well as the raising of dust inside and outside the tank.

Although the gas flames for melting the material appeared to envelope practically all of the exposed area of this heaped and unevenly distributed material, it has been observed that considerable amount of the heat required to melt the batch was taken by conduction from the molten bath itself through the portion of the material below the bath surface. This condition was caused in view of the fact that in the previously-known methods, a major proportion of the material of the localized piles of the batch sank below the surface of the molten bath, and the flames could not play efficiently upon such partially submerged bulky piles of batch material.

The improved apparatus is so designed that the glass-making material is fed uniformly to provide a relative-thin layer or blanket of material beginning at the entrance end of the furnace while maintaining such blanket progressively in substantially the thin blanket form as it is moved further into the tank and progressively melted. After the material, in its relatively thin layer form, has been fed into the tank, the fuel flames and the heat radiated from surrounding heated refractories cause a fritting or sintering of the upper layer surface, and this action insures a coherent relation among the particles of the upper sides of the batch layer. Whatever batch or atmospheric agitation that may result from progressively incorporating the batch material in the molten bath, or from the force of the fuel jets projected into the tank, does not disturb the uniformity of the blanket or raise any dust in the tank atmosphere.

Cullet can be added to the batch in desired proportions, and ordinarily the batch is prepared to contain approximately four to six per cent, by weight, of moisture to insure a tendency of the batch particles to cohere. This kind of uniform blanket is susceptible to melting much more uniformly and efficiently than the batch fed by known methods because the gas flames can then be directed into contact with a greater portion of the thin blanket on the exposed surface thereof.

In conventional practice, the temperature required for proper melting of the batch is of such intensity that the refractories of which the tank walls are constructed are taxed almost to their limit. However, by employing the improved method of providing a thin blanket of material over the surface of the bath, the melting can be accomplished at materially reduced temperatures. That is, instead of employing temperatures almost equal to the critical resistance of the refractories, more favorable tolerances in safety factors of the refractories are available. Hence, the life of the refractories is greatly prolonged without adversely affecting the molten condition of the glass bath. Material saving in both the refractory walls of the tank and the gas fuel can thus be effected. Reduction of temperatures in the values of approximately 75° to 125° F., as compared with conventional operation of glass melting tanks, result from the practice of the improved method.

Figure 4:
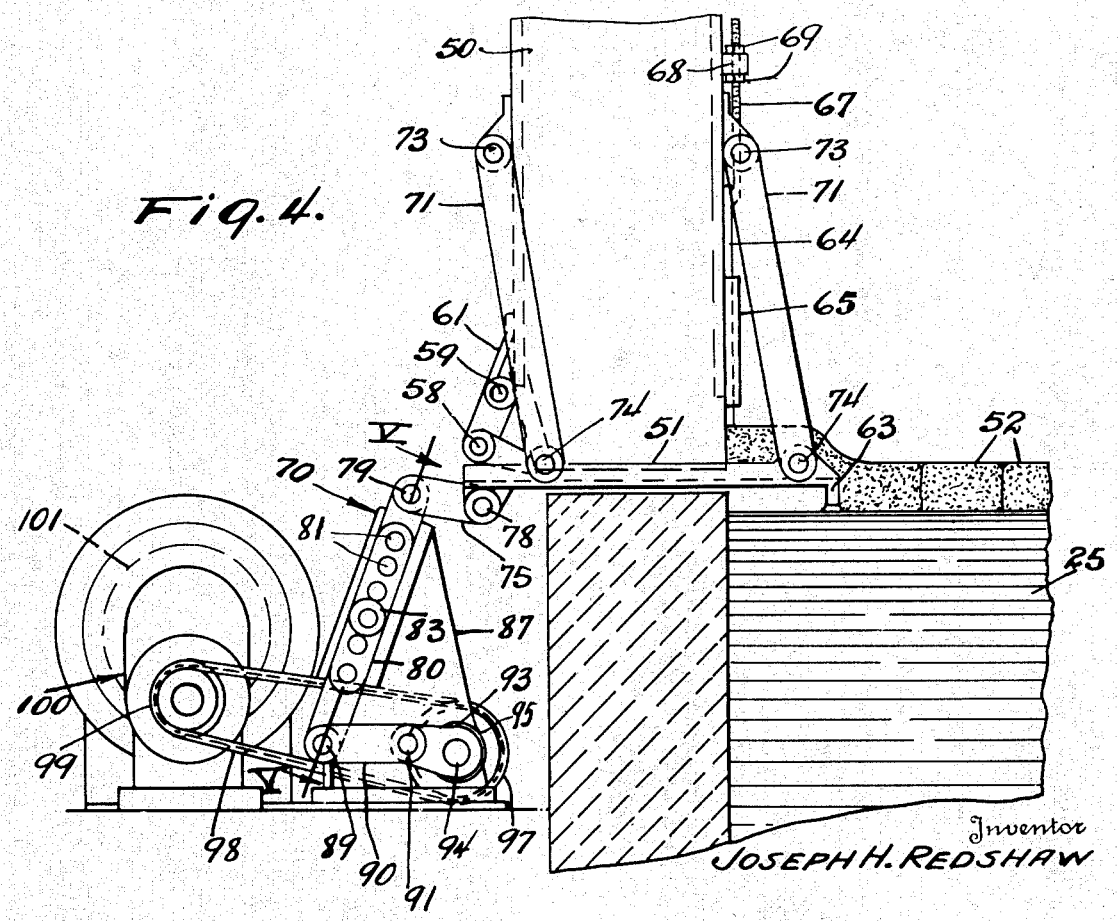

In the drawings:

Fig. 1 is a diagrammatical fragmentary plan of a glass melting tank; Fig. 2 is a vertical section taken substantially along the line II—II of Fig. 1; Fig. 3 is a fragmentary horizontal section taken substantially along the line III—III of Fig. 2; Fig. 4 is a fragmentary vertical section, on a larger scale, showing in detail parts of a batch feeding mechanism; Fig. 5 is a fragmentary vertical section taken substantially along the line V—V of Fig. 4; Fig. 6 is a fragmentary vertical section, on a larger scale, of a sealing structure for the rear wall of a hopper; Fig. 7 is a rear elevation of a lever mounting for transmitting power; Fig. 8 is a side elevation of the device shown in Fig. 7; and Fig. 9 is a fragmentary vertical section taken substantially along the line IX—IX of Fig. 8.

In practicing the invention, a glass melting tank or furnace 20 is provided with an entrance extremity 22 which is almost as wide as the body of the tank. During its operation, the tank contains a bath of molten glass 25 which is maintained in molten state by means of flames from suitable fuel fed through ports 26 in the tank walls 27. The tank includes a roof 28, supported upon tank walls 30, according to well-known methods of construction. In one form of apparatus known as a regenerative type of tank, the flames are played over the surface of the bath alternately at proper intervals from opposite sides of the tank. Ordinarily tanks of this general type are operated continuously and the molten bath moves toward the exit extremity 29 from which glass can be drawn in sheet form.

A rear vertical wall 33 is erected across the entrance end of the tank and is provided with a lower horizontal section 34 which has its lower surface so positioned as to be spaced in parallel relation only a short distance from the upper surface of the molten bath. Suitable coolers 35 and 38 are disposed along the outer vertical side of the wall and along its horizontal section. The particular construction of this sectional vertical wall does not constitute per se a part of the invention claimed herein. The outside or rear edge of the horizontal section 34 supporting the cooler 38 is located materially inwardly or forwardly of the plane of the rear bath retaining wall 40 of the tank.

Batch material 39 containing ingredients suitable for making glass are fed uniformly upon the surface of the molten bath adjacent the rear end wall 40, and the blanket so formed on the surface of the bath moves underneath the horizontal wall section 34 in close proximity thereto into the main body of the tank. Flames playing over the upper surface of the uniformly spread material cause it to melt gradually as the glass bath moves away from the entrance extremity and the replenishing or incoming material is entirely melted approximately by the time it reaches the location indicated by the transverse broken line 43 in Fig. 1; that is, along the area known as the foam line. In response to heat applied in the tank, the glass bath reaches substantially its maximum temperature in the vicinity of this foam line and this maximum temperature is maintained over a limited area as the bath moves forwardly and is gradually cooled sufficiently to conform to the temperature required in drawing sheet glass at the exit or drawing end of the tank. The unmolten or partially melted blanket of material assumes the shape indicated at 45 of this figure, wherein it will be apparent that the width and thickness of the blanket of material diminishes gradually as it passes farther into the tank until the material before it reaches the exit end of the tank is merged into the bath in uniformly melted state.

In this manner the maximum area of each flame from the heating fuel comes in contact with the upper surface of the material to provide the maximum heat on this surface with minimum expenditure of fuel. The batch material passing across the space between the rear bath retaining wall 40 and the outer or rear edge of the horizontal section 34 is relatively cool on its upper side, although the hot molten glass bath is underneath, and such upper side reaches approximately 200° to 300° F. before it is conducted beneath the horizontal section. However, in passing underneath the latter section, the material is heated to such extent that its upper side becomes fritted or sintered to form a continuous coherent surface of somewhat viscous consistency, but having sufficient body or strength to maintain its layer form and effectively resist buckling or distortion from forces pushing it farther into the tank.

This blanket of material thus fritted is in proper condition to receive the fuel flames thereover without danger of agitating the batch particles or raising dust therefrom.

The atmospheric pressure in the tank, that is, inside or forwardly of the wall section 33, is substantially neutral, and since the lower side of the horizontal section 34 is in close proximity to the blanket passing underneath it, there will be no appreciable loss of heat at the charging end of the tank. In previously known types of tanks, the openings in the rear or charging end thereof were not sufficiently closed, or were frequently opened to receive the charges of batch, and flames had a tendency to blow outwardly through these openings in such manner as to carry dust into the building that houses the tank. This action which is known as "sting out" is entirely obviated by the improved method of batch feeding, and there is also obviated the dust nuisance and loss of heat which would accompany such action. The blanket of batch material between the bath retaining wall 40 and the outer edge of the horizontal section prevents loss of heat from the glass bath therebeneath. Likewise, the blanket extending uniformly a considerable distance into the tank insures maintenance of heat below it, while at the same time, presenting the maximum area for contact with the heating flames. These factors operate to reduce fuel consumption, as well as to increase efficiency of the tank.

In operating one form of mechanical construction for feeding the batch material into the tank, a hopper 50 is filled to proper level with granular glass-making material which contains proper ingredients and admixed to such consistency as to produce the type of sheet glass desired. This hopper extends substantially the entire distance across the entrance portion of the tank and the granular material or batch rests under gravity upon a horizontally swingable carrier or plate 51 that extends transversely across the entrance extremity of the tank which is substantially coextensive with the discharge opening 53 of the hopper. This plate is reciprocable from the full line to the broken line position indicated in Fig. 2.

When the plate 51 is disposed rearwardly in its broken line position with the material from the hopper resting thereon; then the forward horizontal movement of the plate to the full line position carries with it a predetermined layer 52 of the batch material. The latter material is then disposed in a position immediately overhanging the surface of the molten bath and the material in the hopper drops down upon the rear portion of the plate behind the material which has been carried forwardly. By moving the plate rearwardly, that is, by withdrawing it from its position above the bath, the layer 52 cannot also be carried backwardly because the space previously occupied by this layer will have been filled by the material dropping behind it from the hopper. Hence, by withdrawing the plate 51, the batch layer 52 begins to drop upon the bath from the forward plate edge and continues to drop therefrom as the latter moves rearwardly and until the material is spread or distributed substantially uniformly along an area corresponding in width to the distance from the forward limit of reciprocation of the plate 51 to the adjacent edge of the tank wall 40.

The rear wall of the hopper is provided with a lower inclined plate shield 54 and an upper inclined plate shield 57 having pivotal supports 58 and 59, respectively, along their upper edge portions. The upper shield is disposed at a sharper incline than the lower shield and its front edge rides upon the front portion of the lower shield. A downwardly bent flange 60 formed on the inner edge of the shield 54 is directed downwardly into frictional contact and in floating relation with the upper side of the carrier 51. Since the rear edge of the shield is freely pivoted, the flange is maintained in proper scraping contact with the carrier under the influence of gravity. The carrier 51 in its forward and rearward action thus moves relative to the shields 54 and 58.

The upper edge of the upper shield 56 is overlapped behind the lower rear edge of the hopper wall and its lower edge portion rests under the influence of gravity upon the shield 54 adjacent the flange 60 thereof. This arrangement compensates for movement of the carrier 51 in maintaining the flange 60 in contact therewith, and prevents the rearward displacement of the batch material during such movement. A bracket 61 welded or otherwise secured to the rear wall of the hopper carries the pivotal connections 58 and 59 for supporting the shields.

The size of the feeding opening 53 at the front side of the hopper is controlled by means of an upright gate 64 that is vertically slidable in a guide 65 carried by the front wall of the hopper, and suitable adjusting rods 67 are disposed through brackets 68 on the hopper for purposes of adjustment by manipulation of nuts 69 carried on the rods on opposite sides of the brackets.

In the succeeding forward movement of the plate 51 in its reciprocation, the next layer 52 of material, as previously described, will be moved forwardly and against the first layer 52 by the aid of a flange 63 on the plate 51, and in such manner as to push the first layer farther into the tank. This action is repeated intermittently at desired intervals, or constant reciprocation of the plate is timed in such manner as to provide for uniformly feeding the batch material at whatever rate that is desired.

In one form of reciprocating or swinging mechanism 70, opposite end portions of the batch carrier 51 are provided with pairs of links 71 having pivotal connections 73 at their upper ends securing them to the hopper 50, and at their lower ends having pivotal connections 74 securing them to the carrier 51 adjacent the front and rear edges thereof. These links 71 are equal in length and are so arranged that the carrier plate suspended thereby is maintained in horizontal position although its level changes in connection with the arcs of the swinging movement of the pivotal connections 74.

A plurality of rearwardly extending links 75 are provided with pivotal connections 78 securing their forward ends to the rear edge portion of the carrier plate 51. Each link 75 has a pivotal connection 79 securing its rear end to the upper end of an oscillatable lever 80 which has a plurality of bearing openings 81 spaced longitudinally therein. A removable bearing pin 83 pivotally supports the lever and is adapted to extend through any of the openings 81 in supporting the lever. The bearing pin 83 is supported in one of the openings 84 formed in a flange 85 of a support 87. The openings 81 and 84 are correspondingly spaced and the pin can be mounted in any two of these registering openings for the purpose of altering the lever stroke from the pivotal connection 79 to the pivotal pin 83 supporting the lever.

The lower end of the lever 80 has a pivotal connection 89 securing it to one end of a pitman 90 which has at its other end a pivotal connection 91 securing it to a crank arm 93 of a horizontally disposed shaft 94. Suitable bearings 95 in the support 87 rotatably support the shaft. Sprocket and chain gearing 97, 98 and 99 transmit power from a conventional reduction gearing unit 100 which is driven by a motor 101.

The form of transmission lever 80 shown in Figs. 7 to 10 is connected in the same manner as that described above to the line 75 and pitman 90. However, a sectional clamping collar 103 embracing the intermediate portion of the lever can be released from the latter by loosening a set of bolts 104. A bearing pin 105 rigidly secured to the clamping collar is rotatably mounted in a block 107 that is provided with oppositely extending threaded rods 108 disposed through webs 109 formed in the upper and lower portions of the support 87. By manipulating nuts 110 threaded upon the rods at the outer sides of the webs and loosening the clamping bolts 104, the block 107 and the bearing pin 105 can be adjusted along the lever for the purpose of altering the extent of the stroke of the lever and the swinging stroke of the batch carrying plate 51. This adjustment can be effected without altering the relative positions of the pitman 90 and the crank 93.

The support 87 and the lever 80 can be graduated, as indicated at 113, for the purpose of aiding in gauging the stroke of the lever.

In the type of glass melting tank described herein, one or more glass sheets can be drawn, and the amount of batch fed by each stroke of the lever and batch carrier can be regulated according to the amount of glass drawn from the tank. Thus an exact balance between feeding and drawing can be maintained and the level of the glass bath maintained constant.

In operating tanks of the type described herein, it has been observed that under certain conditions one side of the tank may be more exposed to lower temperatures than the other side. For example, if the lower side of the tank shown in Fig. 1 were cooler the blanket of batch would have a tendency to drift toward this cooler side and disturb the uniformity of movement of the blanket in the tank. For purposes of counteracting this tendency, the hopper can be provided with a partition 120 to define a border line of the fed material at a location farther inwardly from the cooler side of the tank, and in order to avoid exposure of the bath surface adjacent the rear tank corners (Fig. 3) refractory members 121 provided to cover the rear corner portions of the tank can be extended farther inwardly according to the position of the blanket of batch material.

While the invention has been described particularly with regard to its applicability in the operation of glass melting apparatus, it is to be understood that it is also applicable in other respects where it may be desirable to feed a blanket of granular material upon a molten bath. For example, in the manufacture of sodium silicate, or in the copper industry where it is desirable to feed copper concentrates upon a molten copper bath.

Although practical construction illustrating the invention has been shown and described in detail, it will be apparent to those skilled in the art that the invention is not so limited but that various changes can be made therein without departing from the spirit of the invention or from the scope of the appended claims.

I claim:

1. In a batch feeder adapted to feed granular batch in layers on a bath of material, a device movable forwardly and rearwardly to assume positions above the bath and to carry forwardly a layer of batch therewith, means suspending the device in swinging relation to provide for its forward and rearward movement, and means for depositing the batch on the bath from the forward extremity of said device as the latter is moved rearwardly.

2. In a batch feeder having a bath-containing receptacle disposed adjacent thereto for receiving on the bath granular batch in layer form, a hopper opening into the receptacle and extending substantially across the receptacle width, a swinging member constituting the bottom of the hopper and swingable inwardly to a position directly overhanging the bath to carry the batch into the receptacle, overhead suspending elements carrying said member in its swinging relation, and means for depositing the batch on the bath from the forward extremity of said member as the latter is swung outwardly from over the bath.

3. In a batch feeder having a bath-containing receptacle disposed adjacent thereto for receiving on the bath granular batch in layer form, a substantially horizontally disposed support adjacent said receptacle and repeatedly swingable over the edge of the latter in close proximity thereto, means for supplying batch upon the support to be carried by the latter into the receptacle, parallel suspension members supporting said support to form a swing, and means for repeatedly feeding the batch in side by side layers on said bath as the support repeatedly swings in a direction away from the receptacle.

4. In a batch feeder having a bath-containing receptacle disposed adjacent thereto for receiving on the bath granular batch in layer form, a hopper opening into the receptacle and extending substantially across the latter along a marginal portion thereof, a swinging member constituting the bottom of the hopper and swingable inwardly to a position directly overhanging the bath to carry the batch into the receptacle, overhead suspending elements carrying said member in its swinging relation, and a floating wall section at the rear side of the hopper to prevent rearward movement of the batch as said member swings rearwardly.

5. In a batch feeder having a bath-containing receptacle disposed adjacent thereto for receiving on the bath granular batch in layer form, a hopper opening into the receptacle and extending substantially across the latter, a swingable feeder constituting the bottom of the hopper and swingable inwardly to a position overhanging the bath to carry granular batch into the receptacle, suspending elements carrying said feeder in its swinging relation, and means adjacent the rear wall of the hopper preventing rearward movement of the batch as said member swings rearwardly, and means for swinging the feeder to and fro.

6. In a granular batch feeder, a plate having means suspending it in substantially horizontal swinging relation, means for supplying granular batch upon the plate, an oscillatable lever connected to the plate for oscillating the latter in its swinging relation, means for pivotally supporting the lever at an intermediate portion thereof, driving means for oscillating the lever, and means for varying the position of the intermediate pivotal support of the lever and thereby varying the stroke of oscillation of the plate and means for depositing the batch from the forward edge of the plate as the latter is moved rearwardly in its oscillation.

7. In a batch feeder having a bath-containing receptacle disposed adjacent thereto for receiving on the bath granular batch in layer form, a device movable forwardly and rearwardly into and out of position above the molten bath to carry forwardly therewith the batch in layer form, said device having a downwardly projecting pusher for moving forwardly a deposited layer of batch thereby making room for the next succeeding layer, means suspending the device in swinging relation to provide for its forward and rearward movement, means for depositing the batch on the bath from the forward extremity of said device as the latter swings rearwardly, and means for imparting swinging movement to said device.

8. In a batch feeder having a bath-containing receptacle disposed adjacent thereto for receiving on the bath granular batch in layer form, a device movable forwardly and rearwardly to assume positions above the bath and to carry forwardly therewith granular batch in layer form, means suspending the device substantially in horizontal swinging relation to provide for its forward and rearward movement, means for depositing the granular batch on the bath from the forward extremity of said device as the latter swings rearwardly, and variable means for oscillating the device in varying degrees of swinging movement.

JOSEPH H. REDSHAW.